(12) United States Patent
Agari et al.

(10) Patent No.: US 7,408,741 B2
(45) Date of Patent: Aug. 5, 2008

(54) MAGNETIC DISK SLIDER HAVING IMPROVED INCLINATION MARGINS IN A ROLLING DIRECTION

(75) Inventors: Hiroshi Agari, Odawara (JP); Lee Kevin Dorius, San Jose, CA (US); Kiyoshi Hashimoto, Yokohama (JP); Yoshinori Takeuchi, Ishioka (JP)

(73) Assignee: Hitachi Global Storage Technologies Netherlands B. V., Amsterdam (NL)

( * ) Notice: Subject to any disclaimer, the term of this patent is extended or adjusted under 35 U.S.C. 154(b) by 369 days.

(21) Appl. No.: 11/193,969

(22) Filed: Jul. 29, 2005

(65) Prior Publication Data

US 2007/0025022 A1 Feb. 1, 2007

(51) Int. Cl.
*G11B 5/60* (2006.01)
(52) U.S. Cl. ............... 360/235.8; 360/236.3; 360/236.1
(58) Field of Classification Search ............. 360/235.8, 360/236.1, 236.3, 236.6, 236.8, 237
See application file for complete search history.

(56) References Cited

U.S. PATENT DOCUMENTS

| | | | |
|---|---|---|---|
| 6,657,820 B2 | 12/2003 | Kohira et al. | 360/236.3 |
| 6,710,964 B1 | 3/2004 | Rao et al. | 360/75 |
| 6,785,093 B2 * | 8/2004 | Baba et al. | 360/235.7 |
| 7,106,556 B2 * | 9/2006 | Pendray et al. | 360/235.8 |
| 2002/0191341 A1 | 12/2002 | Kohira et al. | 360/235.8 |
| 2005/0225902 A1 * | 10/2005 | Kohira | 360/235.8 |
| 2005/0254174 A1 * | 11/2005 | Nikitin et al. | 360/235.7 |
| 2006/0139810 A1 * | 6/2006 | Hashimoto et al. | 360/235.8 |
| 2007/0121251 A1 * | 5/2007 | Yoshida | 360/236.3 |

* cited by examiner

*Primary Examiner*—Jefferson Evans
(74) *Attorney, Agent, or Firm*—Zilka-Kotab, PC (57) ABSTRACT

A magnetic head slider suitable for a disk drive measuring 1.8 inches or less in disk size incorporates preventive measures against the decreases in lifting force that occur in small sliders with a slider width of 0.8 mm or less. The present invention improves the inclination margins of the flying slider in a rolling direction at the lowest flying point, and achieves low flying height and stable flying. The slider is constructed with stepped surfaces on the slider's leading-side flying surface formed up of shallow-grooved surfaces and a deep-grooved surface so that a trailing-side width W2 between the stepped surfaces is smaller than a leading-side width W1.

10 Claims, 7 Drawing Sheets

Processing sequence applied in the present invention

MAGNETIC DISK SLIDER HAVING IMPROVED INCLINATION MARGINS IN A ROLLING DIRECTION

BACKGROUND OF THE INVENTION

The present invention relates to magnetic head sliders that, in magnetic disk drives and the like, travel along the surfaces of recording media with a very small flying clearance or come into intermittent contact with the recording medium surfaces. More particularly, the invention is concerned with magnetic head sliders that are not only excellent in shock resistance and in flying characteristics in a disk drive that uses small-diameter disks of 1.8 inches or less, but also suitable for mass production.

Figure 11:
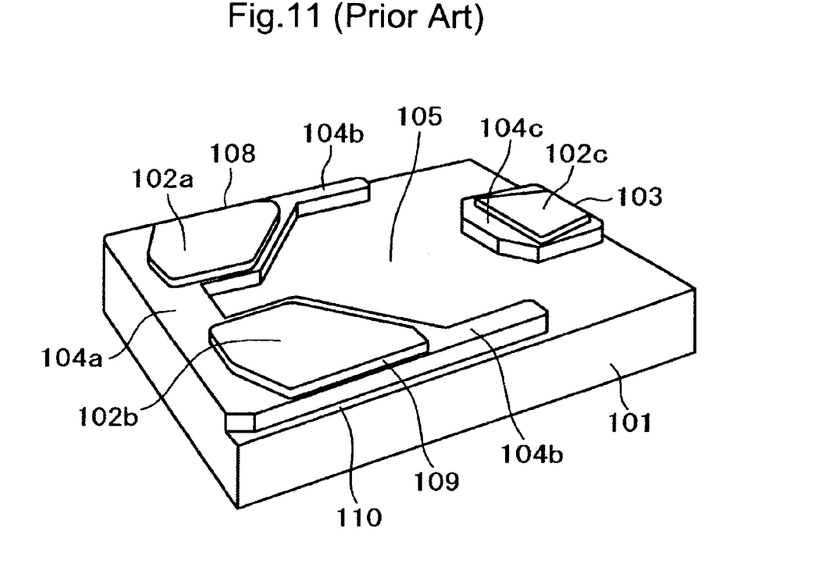
FIG. 11 is a perspective view showing a flying surface of a positive-pressure/negative-pressure combination-type magnetic head slider based on a conventional technology.
Figure 12:
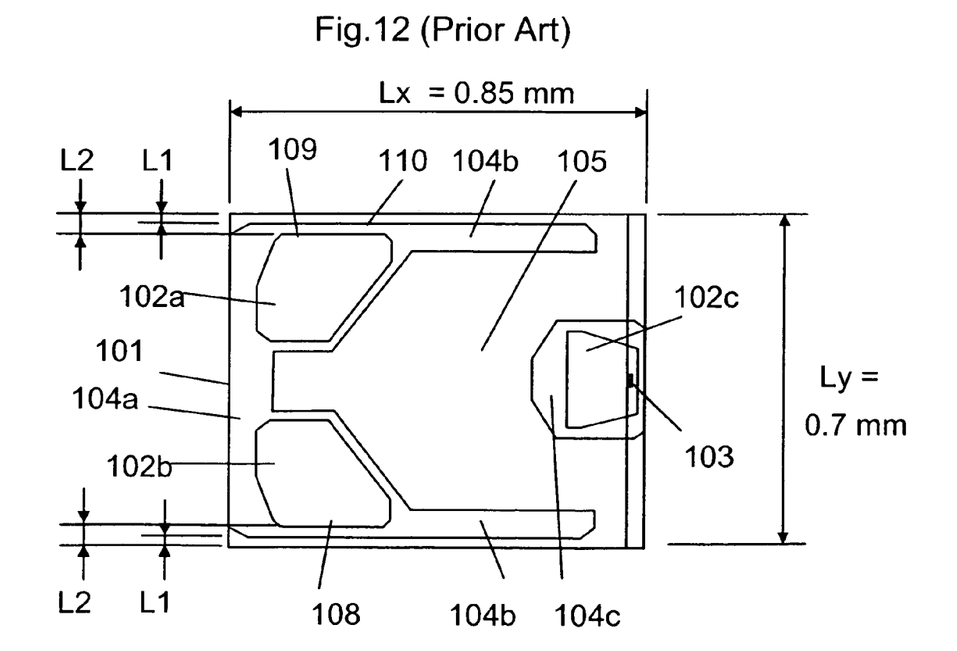
FIG. 12 is a plan view of the flying surface of the magnetic head slider shown in FIG. 11.

Magnetic head sliders are each supported by the flexure installed on a suspension, and fly along the surfaces of magnetic disks with a very small clearance or come into intermittent contact with the magnetic disk surfaces. Data is written and read in this way. A prior art slider 101 is illustrated in FIGS. 11 and 12. The slider 101 has a medium-facing surface (bearing surface) 108, which is constructed of a flying surface 102 (102a, 102b, 102c), a shallow-grooved surface 104 (104a, 104b, 104c) slightly lower than the flying surface 102, and a deep-grooved surface 105 even lower than the shallow-grooved surface 104 provided below the flying surface 102. The flying surface 102 includes one pair of left and right leading flying surfaces 102a and 102b provided at rear portions of the shallow-grooved surface 104, near a leading edge, and a central pad 102c provided at a trailing edge and mounted with a magnetic head 103. The shallow-grooved surface 104 includes a shallow-grooved surface 104a present at a leading edge, shallow-grooved rails 104b on lateral sides, and a central pad shallow-grooved surface 104c on the leading side of the central pad 102c. The deep-grooved surface 105 is surrounded by a shallow-grooved surface 104a present at the leading edge, flying surfaces 102a, 102b on the leading side, and the shallow-grooved rails 104b on the lateral sides. In this configuration, a stepped air-bearing action by the shallow-grooved surface 104a and the flying surfaces 102a, 102b, generates a lifting force to make the slider fly above a magnetic disk, and the deep-grooved surface 105 generates a negative pressure at the same time, whereby appropriate air-bearing rigidity and stable flying are ensured. The slider may measure 1.25 mm in length Lx, 1.0 mm in width Ly, and 0.3 mm in height Lz.

In recent years, magnetic disk drives tend to be enhanced in density and to shift to the smaller magnetic disk drives that use smaller disks and are intended for application to more compact digital equipment. In order to respond to these tendencies, sliders are dimensionally reduced as a method of obtaining effective data areas on disk surfaces. A plan view of a compact slider dimensionally reduced to about 70% of the foregoing slider now commonly used is shown in FIG. 12. Slider 101 measures 0.85 mm in length Lx, 0.7 mm in width Ly, and 0.23 mm in height Lz. Use of the compact slider 101 increases a disk's effective data area by 0.3 mm. This increase is a significant improvement for compact magnetic disk drives having a disk size of 25.4 mm (1") or 20.3 mm (0.8").

During conventional slider processing, the bearing surfaces for about 40 such sliders lined up in single file from left to right to be lapped as a set in a bar condition. Then the shapes of the bearing surfaces are formed in a dry process such as ion milling, and the bar is split into individual sliders by chipping. Chipping alleviates stresses, thus resulting in the chipped sections of each bearing surface 108 being locally deformed. Both ends of the bearing surface have a concave-shaped profile, looking as if they would jump out toward a recording medium. Local deformation is observed particularly on both sides of the slider. The local deformation causes fluctuations in flying characteristics, impedes low flying and stable flying, and results in disk damage due to contact during load/unload states. In the conventional processes, therefore, flying surfaces 102a and 102b on the leading side are each provided, at both edges, with a 30-μm-wide shallow-grooved surface 109 and externally thereto, a 30-μm-wide chipping allowance 110 having the same depth as that of a deep-grooved surface 105. Length L2 from an edge of the flying surface to an end of the slider is 60 μm, and length L1 from the edge of the flying surface to the shallow-grooved surface is 30 μm.

As its size is reduced, the compact slider decreases in the area of the bearing surface and thus significantly decreases in lifting force based on air-bearing characteristics. To ensure a balance with respect to the reduced lifting force, the suspension load applied to the slider also needs to be reduced. Since the lifting force based on air-bearing characteristics changes in proportion to disk speed, the above tendency is significant in low-disk-speed 2.5-inch magnetic disk drives and in the drives that use magnetic disks 45.7 mm (1.8") or less in diameter. The problem of the insufficiency in the lifting force based on air-bearing characteristics does not occur in conventional 3.5-inch magnetic disk drives or in the high-speed types of 2.5-inch magnetic disk drives operating at magnetic disk speeds such as 5400 rpm or 7200 rpm. The problem of a decrease in the lifting force is a new problem that is produced by practical use of magnetic disk drives that use a small disk such as 25.4 mm (1") or 45.7 mm (1.8").

A decrease in the lifting force causes several problems. A first problem is that air-bearing rigidity decreases and thus that the flying characteristics of the slider deteriorate. A second problem is that since the suspension load needs to be reduced, the shock resistance of the drive during operation decreases. A third problem is that the sliders operating at both positive and negative pressures have a stabilization region in which negative pressures occur in a negative-pressure area, and a "Bi-Stable" region allowing the slider to take both a high-flying mode in which it generates positive pressures even in the negative-pressure area and flies with a flying height of at least 1 μm, and a low-flying mode in which the slider flies with its intended flying height. In systems of a small suspension load, the slider enters the "Bi-Stable" region, taking the high-flying mode very frequently, and thus disabling read/write operations. A fourth problem is that when the suspension load applied is too small and the slider is too short, if the above-mentioned decrease in flying height is caused by an external disturbance, vibration, or a decrease in atmospheric pressure or if, at a leading edge, the slider comes into contact with the disk during slider loading (hereinafter, the contact is referred to as pitch-down), the slider maintains its attitude and continue to be in contact because the slider is unable to escape from that state. Consequent damage to the contact section of the disk will result in information being lost. In a worst case scenario, a crash may even occur. A fifth problem is that because a decrease in bearing area reduces the lifting force and the negative pressure at the same time, the decrease rate of flying height with respect to a decrease in atmospheric pressure is increased, which results in flying height margins being lost.

Although the above-mentioned problems can be solved by providing the leading-side flying surface with a stepped surface of height "h", the provision of this stepped surface on the flying surface gives the slider the potential that the lowest flying point on the flying surface exists in two places. More specifically, the two places are the trailing edge of the conventional central flying surface and the trailing edge of the stepped surface mentioned above. To achieve low and stable flying, the lowest flying point must always be set at the air outflow edge of the central flying surface, even for this slider.

An object of the present invention is to provide a magnetic head slider that has a stepped surface on a leading-side flying surface, the slider always having its lowest flying point at the trailing edge of a central flying surface.

BRIEF SUMMARY OF THE INVENTION

In order to achieve the above object, a magnetic head slider according to the present invention has a magnetic head mounted thereon to write information onto and read it from a recording medium. The slider is formed with a bearing surface which applies a gas bearing, and flies above the recording medium, or comes into intermittent contact therewith, by an action of the gas bearing, wherein, in a negative-pressure slider section that has the bearing surface constructed of the flying surface closest to the recording medium. The slider has a shallow-grooved surface with a first depth below the flying surface, and a deep-grooved surface provided with a second depth further below the flying surface so as to be deeper than the above shallow-grooved surface. A positive pressure is generated between the shallow-grooved surface and the flying surface, and a negative pressure is generated at the deep-grooved surface surrounded by the shallow-grooved surface and the flying surface. The flying surface is further formed up from one or more split leading-side flying surfaces, a trailing-side flying surface having the magnetic head disposed thereon and lying in the same plane as one of the leading-side flying surfaces, and a stepped surface having a required height of "h" and lying on the leading-side flying surface. The flying surface further has a trailing-side width W2 of the stepped surface on the leading-side flying surface that is smaller than a leading-side width W1.

Another magnetic head slider according to the present invention has a magnetic head mounted thereon to write information onto and read it from a recording medium and is formed with a bearing surface which applies a gas bearing, and flies above the recording medium, or comes into intermittent contact therewith, by an action of the gas bearing. The slider has a negative-pressure slider section that has the bearing surface constructed of the flying surface closest to the recording medium, a shallow-grooved surface provided with a first depth below the flying surface, and a deep-grooved surface provided with a second depth further below the flying surface so as to be deeper than the shallow-grooved surface. A positive pressure is generated between the shallow-grooved surface and the flying surface, and a negative pressure is generated at the deep-grooved surface surrounded by the shallow-grooved surface and the flying surface. The flying surface is further formed from one or more split leading-side flying surfaces, a trailing-side flying surface having the magnetic head disposed thereon and lying in the same plane as one of the leading-side flying surfaces, and a stepped surface having a required height of "h" and lying on that leading-side flying surface wherein a trailing-side width W2 of the stepped surface on the leading-side flying surface is smaller than a leading-side width W1, and a width of the slider is equal to or less than 0.8 mm.

Additionally, magnetic head sliders according to the present invention are of a configuration in which a leading-side edge of the deep-grooved surface is positioned closer to the leading side than the stepped surface provided on the leading-side flying surface.

Furthermore, in the magnetic head sliders according to the present invention, a leading edge pad flush with a leading-side flying surface is provided at both leading sides of the above leading-side shallow-grooved surface, and a stepped surface with height "h" is further provided on both of the leading edge pads.

The magnetic head sliders according to the present invention are of a configuration in which both sides of the stepped-surface trailing edge on the above leading-side flying surface form line segments parallel to a lateral direction of the slider and reaching both edges thereof.

Moreover, the magnetic head sliders according to the present invention are of a configuration in which the height "h" of the stepped surface on the leading-side flying surface is equal to or less than 50 nm.

Furthermore, a magnetic disk drive according to the present invention is equal to or less than 1.8 inches in size, with a magnetic head slider that has a magnetic head mounted thereon to write information onto and read it from a recording medium. The slider is formed with a bearing surface which applies a gas bearing, and flies above the recording medium, or comes into intermittent contact therewith, by an action of the gas bearing, wherein, in a negative-pressure slider section that has the bearing surface constructed of the flying surface closest to the recording medium, a shallow-grooved surface is provided with a first depth below the flying surface, and a deep-grooved surface is provided with a second depth further below the flying surface so as to be deeper than the shallow-grooved surface. A positive pressure is generated between the shallow-grooved surface and the flying surface, and a negative pressure is generated at the deep-grooved surface surrounded by the shallow-grooved surface and the flying surface. The flying surface is further formed up from one or more split leading-side flying surfaces, a trailing-side flying surface having the magnetic head disposed thereon and lying in the same plane as one of the leading-side flying surfaces, and a stepped surface having a desired height of "h" and lying on that leading-side flying surface. The slider has a trailing-side width W2 of the stepped surface on the leading-side flying surface that is smaller than leading-side width W1.

According to the present invention, it is possible to increase rolling inclination margins of a flying slider at the lowest point thereof to about 1.5 times an initial value of each margin. Also, the lowest flying point can always be fixed at an air outflow edge of a central flying surface, even when flying height changes during pressure reduction and during a seek operation. In addition, the slider can be made to fly stably with low flying height.

DETAILED DESCRIPTION OF THE INVENTION

Preferred embodiments of the present invention will be described in detail below referring to FIGS. 1 to 12. While technically preferable limitations are imposed in various forms on the embodiments described hereunder, the scope of the invention is not limited to these embodiments.

Figure 1:
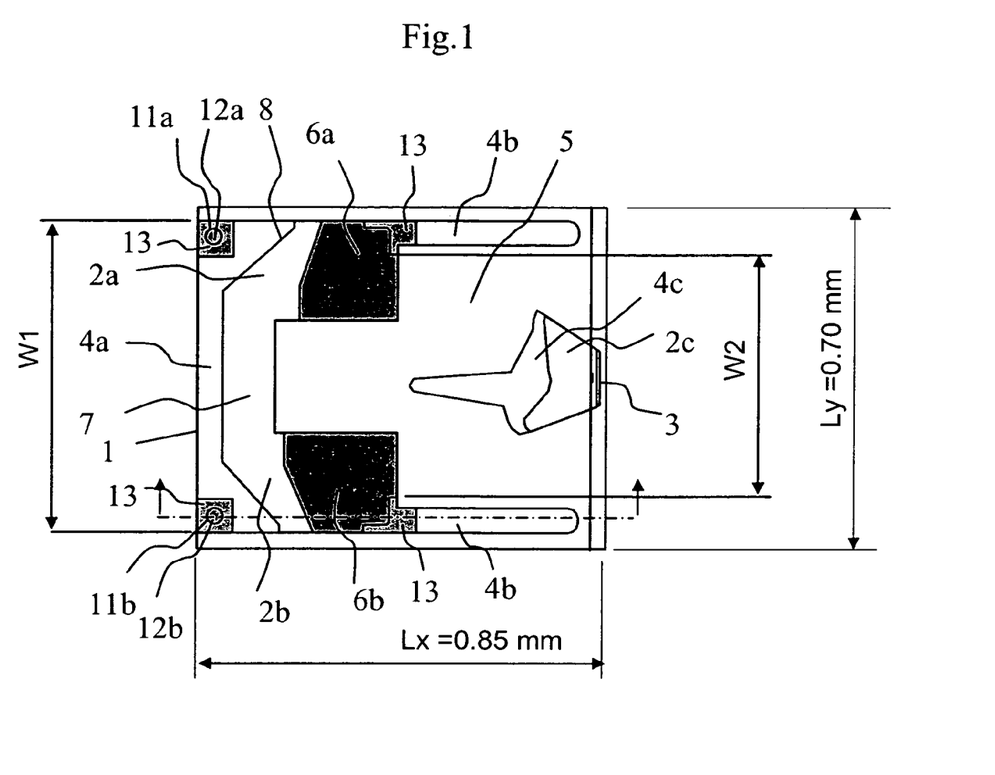
FIG. 1 is a plan view showing a flying surface of a magnetic head slider according to a first embodiment of the present invention.
Figure 2:
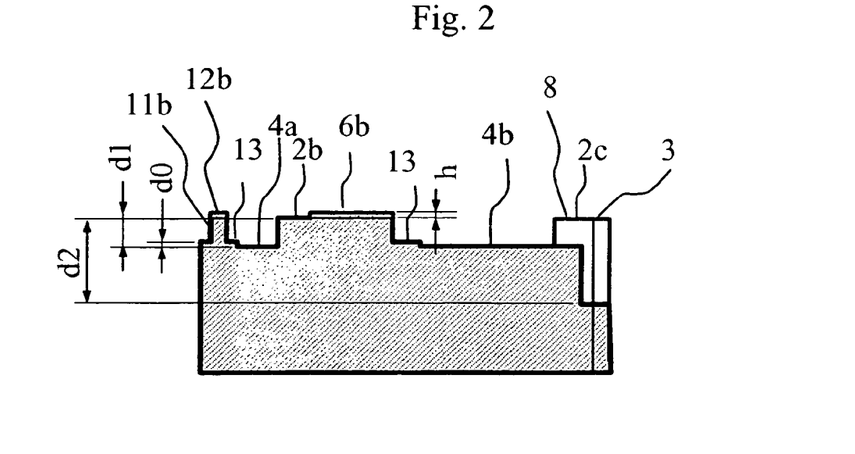
FIG. 2 is a sectional view of the magnetic head slider of FIG. 1.

FIG. 1 is a plan view of a magnetic head slider according to a first embodiment, and FIG. 2 is a sectional view thereof. As shown in FIGS. 1 and 2, in order to generate a lifting force by applying effects of an air bearing, the magnetic head slider according to the present embodiment has a leading-side shallow-grooved surface 4a on the leading side of a bearing surface 8 of a slider 1, and one pair of leading-side flying surfaces 2a and 2b adjacent to the shallow-grooved surface 4a, at rear thereof. The leading-side flying surfaces 2a, 2b are connected at respective leading-side edges to a connection flying surface 7 to form one flying surface. Side shallow-grooved surfaces 4b extending close to the trailing edges of the leading-side flying surfaces 2a, 2b at both rear sides thereof are arranged. A central flying surface 2c is provided centrally in a lateral direction of the slider 1 at a trailing edge thereof, and a magnetic head 3 is mounted on the central flying surface 2c. A central shallow-grooved surface 4c is provided on the leading side of the central flying surface 2c. Stepped surfaces 6a, 6b, both with height "h", are provided on the leading-side flying surfaces 2a, 2b at trailing edges thereof. A deep-grooved surface 5 is provided centrally on the bearing surface 8 surrounded by the leading-side flying surfaces 2a, 2b, the connection flying surface 7, the stepped surfaces 6a, 6b, the side shallow-grooved surfaces 4b, and the central shallow-grooved surface 4c. Boundaries between the rear ends and slider lateral central side of the stepped surfaces 6a, 6b are formed by the shallow-grooved surfaces 4a, 4b and the deep-grooved surface 5. Also, at both corners of the leading side, leading edge pads 11a and 11b that are flush with the associated flying surface are provided and leading edge pad stepped surfaces 12a and 12b, both with a height of "h", are provided on that flying surface. The slider of the present embodiment measures 0.85 mm in length Lx and 0.7 mm in width Ly. Depth "d1" from the flying surfaces and the shallow-grooved surfaces is about 120 nm, depth "d2" from the flying surfaces and the deep-grooved surface is about 650 nm, and it is desirable that height "h" of the stepped surfaces 6a, 6b, 12a, 12b should be 50 nm or less. In the present embodiment, "h" is 30 nm. Width between the stepped surfaces 6a, 6b of height "h" on the trailing side, on the leading-side flying surfaces 2a, 2b, is designed so that trailing-side width W2 between the stepped surfaces is smaller than leading-side width W1. A disk diameter of 1.8 inches and a suspension load (not shown) of 2 gr at 4200 rpm are achieved in the construction having the stepped surfaces 6a, 6b.

When the magnetic head slider according to the present embodiment faces a recording medium, configurations of the shallow-grooved flying surface and of the associated flying surfaces compress an airstream during spinning of the recording medium and thus generate a lifting force by applying the effects of an air bearing. Conversely, on the deep-grooved surface, the airstream spreads and generates a negative pressure. The slider flies where a balance is established between the force generated by the air bearing, and the suspension load that a suspension (not shown) for supporting the magnetic head applies. A maximum flying height is 12 nm at the magnetic head.

Figure 3:
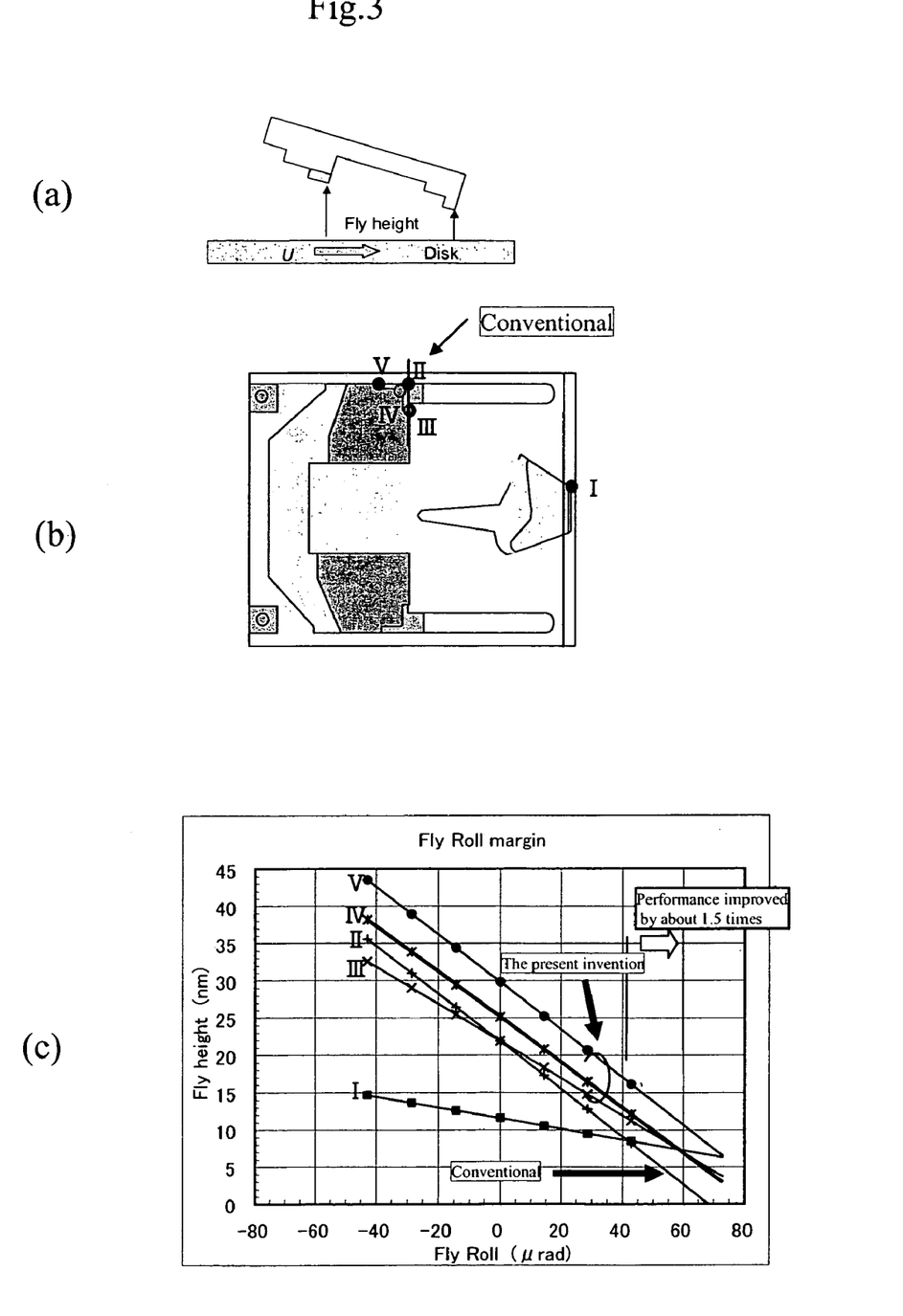
FIGS. 3(a)-3(c) together are explanatory diagram of advantageous effects of the magnetic head slider.

Advantageous effects of the magnetic head slider according to the present embodiment, constructed so that trailing-side width W2 between the stepped surfaces 6a and 6b is smaller than leading-side width W1, are described below using FIGS. 3(*a*) to 3(*c*). As shown in conceptual diagrams of FIGS. 3(*a*) and 3(*b*), in the conventional slider, the lowest flying point during flying is present at the trailing edge of the central flying surface (e.g., at the point denoted as I), whereas, in the slider of the present invention that is provided with the stepped surfaces, the lowest flying point during flying is to be present not only at the trailing edge of the central flying surface, but also at the rear ends of the stepped surfaces (e.g., the points denoted as III, IV, V). When this slider inclines laterally around a longitudinal axis (this inclination angle is called the Fly roll), lateral edges of the stepped surfaces are liable to approach the disk surface and thus to become the lowest flying point. FIG. 3(*a*) shows the relationship between the flying height values obtained at various positions on a flying surface when the Fly roll changes. When the Fly roll is zero, the trailing edge of the central flying surface is the lowest point. When the Fly roll is greater than zero, however, this increases a rate at which the flying height at each position on the flying surface decreases. In the conventional configuration, i.e., in the conventional slider configuration having the relationship of W1=W2, the stepped surfaces have become the lowest point (e.g., the point denoted as II) at a Fly roll of about 60 μrad or more. In the slider configuration of the present invention, however, the lowest point is not reached at up to about 60 μrad, and this indicates an improvement effect about 1.5 times as great. In this configuration, while maintaining the effectiveness of the stepped surfaces that enhances a lifting force, the slider can increase its inclination margins in a rolling direction to 1.5 times and achieve stable flying with a low-flying height. The point denoted as II indicates the lowest flying point on the stepped surface in the conventional configuration (W1=W2). Points III, IV, and V indicate the lowest flying point on the stepped surfaces in the present invention. Also, since the stepped surfaces are constructed of 30-nm-thick carbon or the like, this construction is effective in reducing the disk surface damage suffered in case of contact. In addition, the leading edge pads 11a, 11b provided on the leading side, and the pad stepped surfaces 12a, 12b are effective in avoiding the earlier-mentioned external disturbance, vibration, and pitch-down during loading/unloading, for significantly reducing medium contact damage caused by contact of any corners due to slider vibration, and for avoiding a disk crash.

In the present embodiment, the leading-side flying surfaces 2a, 2b are interconnected at the connection flying surface 7. Thus, the lifting force generated at these connections can be greatly increased. Also, the edge of the deep-grooved surface on the leading side thereof is positioned closer to the leading side than the stepped surfaces 6a, 6b provided on the leading-side flying surface. Since it is thus possible to extend the negative-pressure area, to increase the negative pressure, and to provide a negative-pressure center at a position closer to the leading side of the slider, there is an avoidance effect against the bi-stable state that increases flying height to such an extent that signals cannot be read or written.

In addition, both sides of the stepped-surface trailing edge on the above leading-side flying surface form line segments parallel to a lateral direction of the slider and reaching both edges thereof. This configuration minimizes changes in the flying characteristics of the slider due to mask alignment errors during a forming process for the flying surfaces, especially, the inclination of the slider when it flies in a rolling direction.

This configuration is particularly effective for the small sliders with slider widths of 0.7 mm or less, restricted in terms of ABS (air-bearing surface) shape.

Figure 4:
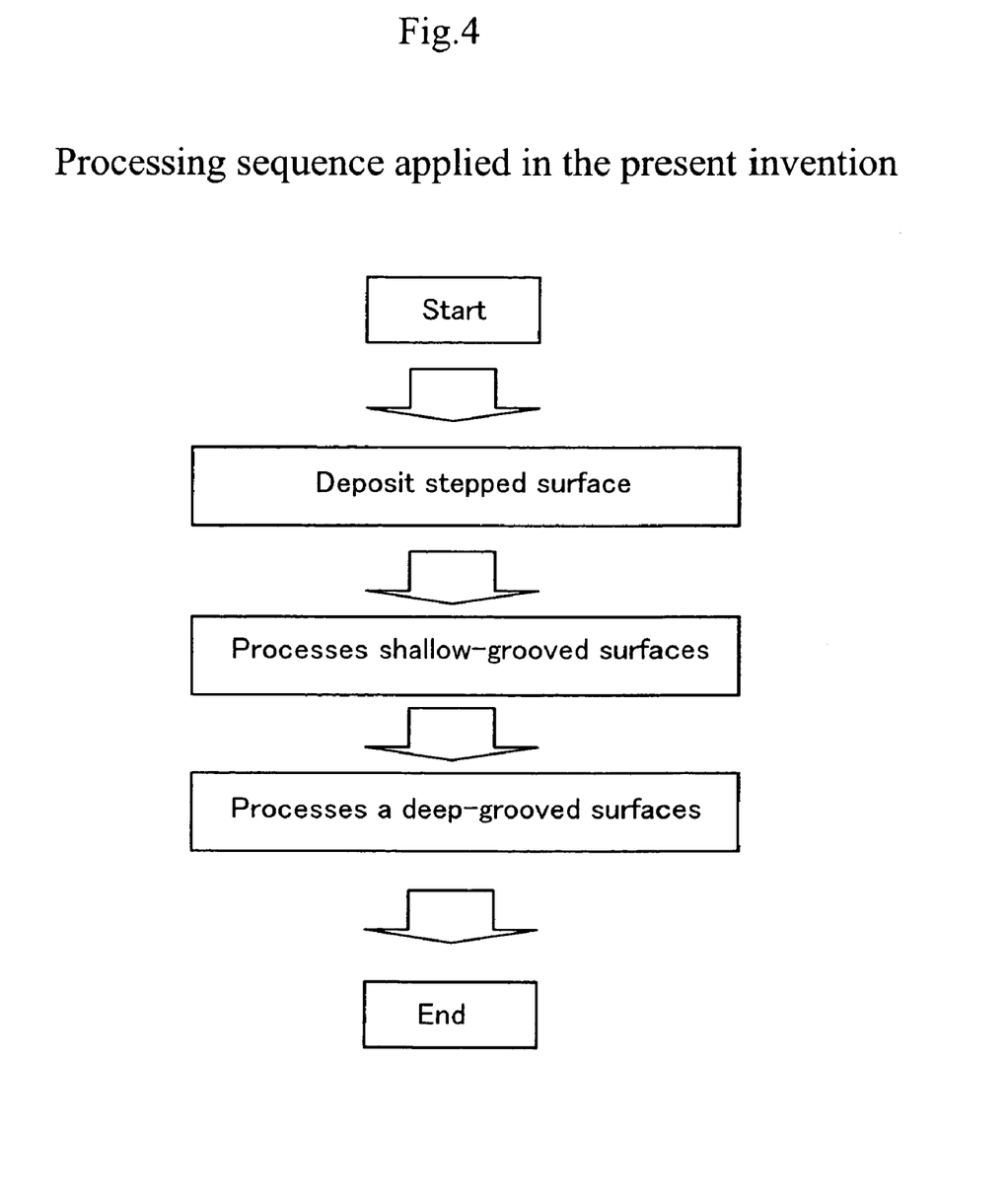
FIG. 4 is a flowchart of the process steps applied in the present invention.

The earlier-described formation of the stepped surfaces of this slider can likewise be conducted by depositing the stepped surfaces after processing of the shallow-grooved surface and deep-grooved surfaces of the slider. The order of processing in this case is realizable as shown in FIG. 4 by way of example. Elements for about 60 sliders lined up in single file from left to right in a bar condition have their flying surface sides and rear sides lapped to form a desired plane. First, stepped surfaces are produced by depositing carbon or the like in a region whose area is larger than that of an as-completed stepped surface. Next, shallow-grooved surfaces are processed with the flying surfaces masked. Finally, a deep-grooved section is processed. Ion milling, RIE, or the like is used in this processing step. In this process flow, deposited films other than the final stepped surfaces are removed to complete the final shape. Using this processing sequence allows reduction in contamination and the like, minimization of contamination-entrapping between stepped surfaces and flying surfaces, and enhancement of adhesion. Processing in this processing flow creates shallow-grooved intermediate surfaces 13. Height "d0" of the shallow-grooved intermediate surfaces 13 is almost the same as height "h" of the stepped surfaces.

Figure 5:
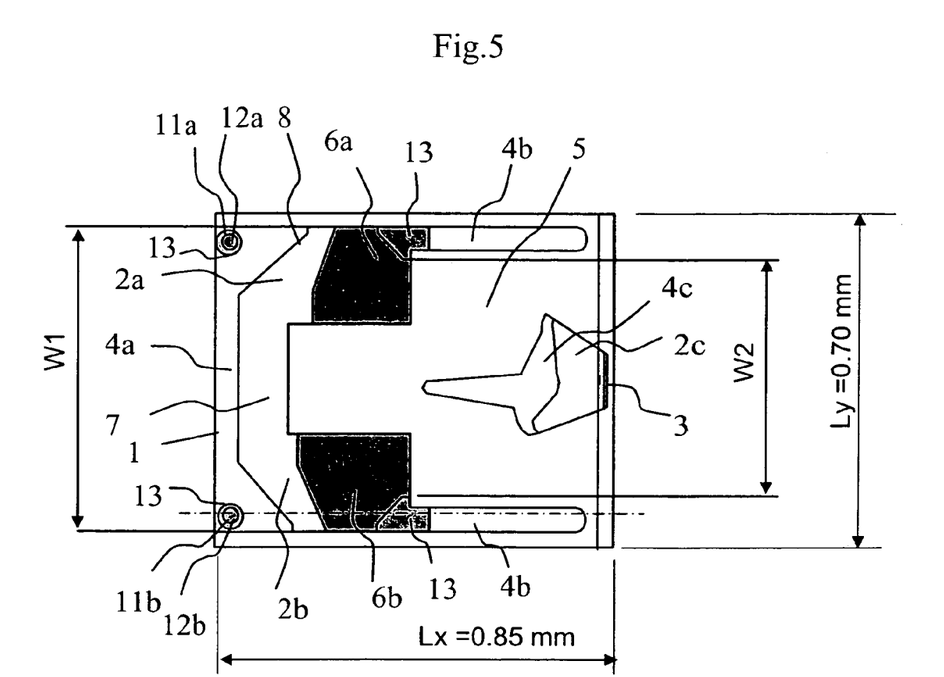
FIG. 5 is a plan view of a magnetic head slider according to a second embodiment of the present invention.

A plan view of a second embodiment is shown in FIG. 5. This figure shows an example in which both sides of stepped surfaces on leading-side flying surfaces 2a, 2b are configured into an essentially linear shape. Although this configuration slightly reduces a lifting force and thus slightly reduces flying characteristics, inclination margins of a flying slider in a rolling direction at the lowest flying point can be further improved. The example in FIG. 5 is also an example in which the shapes of the shallow-grooved intermediate surfaces 13 provided on both sides of the leading edge are reduced in area by being configured so as to be concentric with leading edge pads 11a, 11b. The present embodiment also yields advantageous effects similar to those of the first embodiment.

Figure 6:
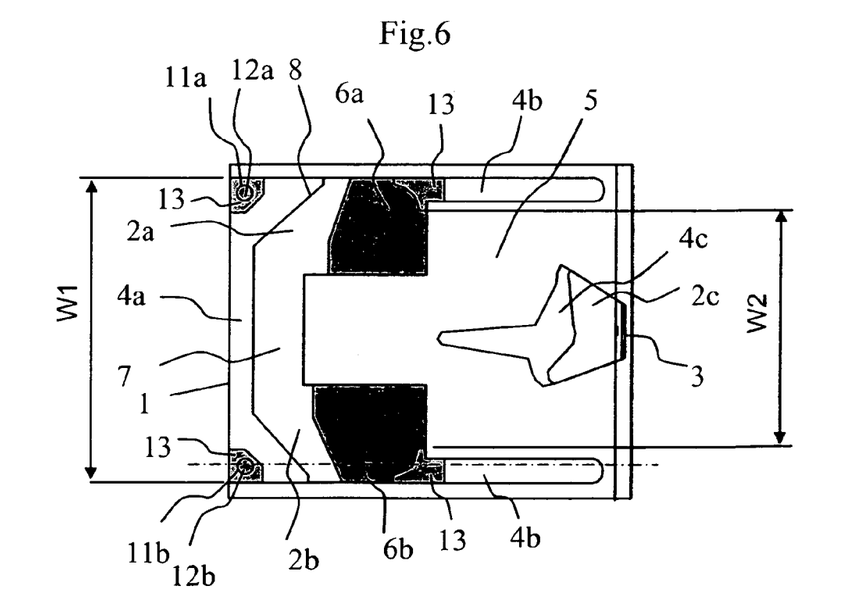
FIG. 6 is a plan view of a magnetic head slider according to a third embodiment of the present invention.

A plan view of a third embodiment is shown in FIG. 6. This figure shows an example in which both sides of stepped surfaces on leading-side flying surfaces 2a, 2b are configured into an essentially arc shape. This configuration makes it possible to minimize decreases in lifting force and to further improve inclination margins of a flying slider in a rolling direction at the lowest flying point. The present embodiment also yields advantageous effects similar to those of the first embodiment.

Figure 7:
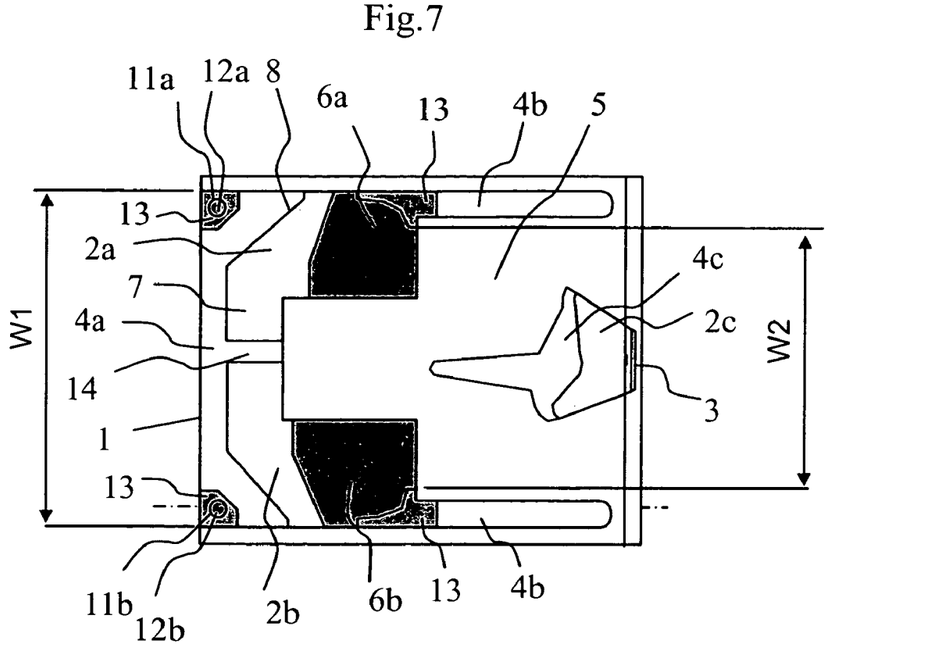
FIG. 7 is a plan view of a magnetic head slider according to a fourth embodiment of the present invention.
Figure 8:
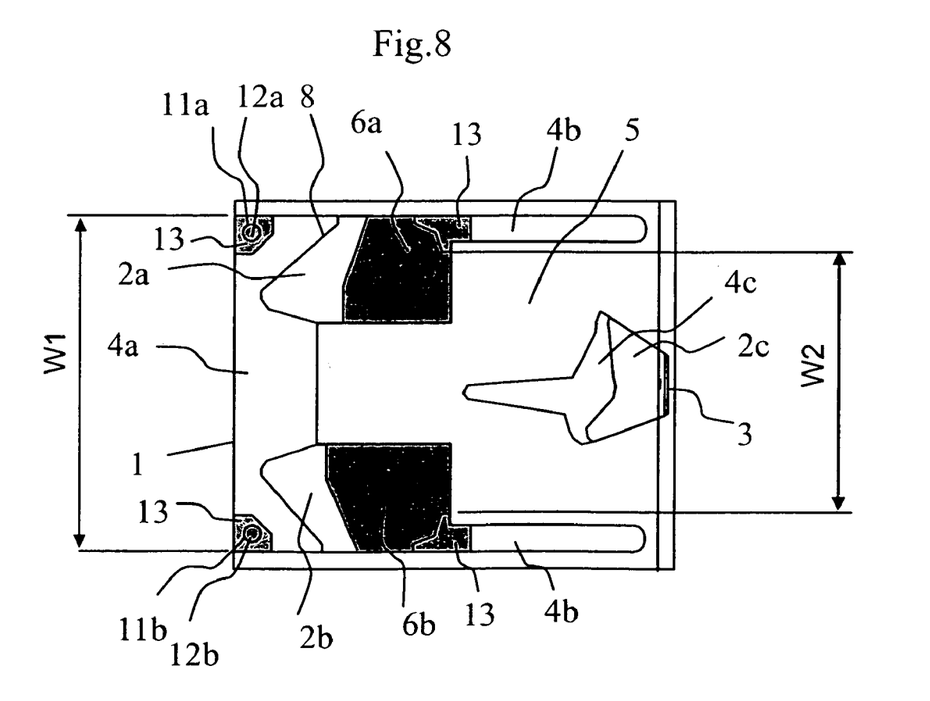
FIG. 8 is a plan view of a magnetic head slider according to a fifth embodiment of the present invention.

A plan view of a fourth embodiment is shown in FIG. 7. This figure shows an example in which a connection flying surface 7 for connecting a leading-side flying surface 2a, 2b is provided with a slit 14 to split the leading-side flying surface 2a, 2b into left and right portions. Although left/right splitting of the leading-side flying surface 2a, 2b slightly reduces a negative pressure, it also allows air-bearing rigidity of an air bearing in a lateral thereof (i.e., in a rolling direction of a slider) to be enhanced for preventing the slider from inclining in the rolling direction during flying. The example in FIG. 7 is also an example in which the position of where the air arrives at leading-side width W1 of the stepped surface 6a, 6b from trailing-side width W2 thereof is moved to the leading side of the slider. Even if lateral planarity by slider chipping is affected by recessing due to local deformation, inclination margins of the slider in a rolling direction at the lowest flying point during flying can be augmented to achieve stable flying. For these reasons, the present embodiment also yields advantageous effects similar to those of the first embodiment. A fifth embodiment is shown in FIG. 8. This figure shows an example in which a connection flying surface is not present and leading-side flying surface 2a, 2b is split into left and right portions. It is also an example in which the present invention is applied to a slider high in disk speed and great in the lifting force generated on the flying surface. This embodiment also yields advantageous effects similar to those of the first embodiment.

Figure 9:
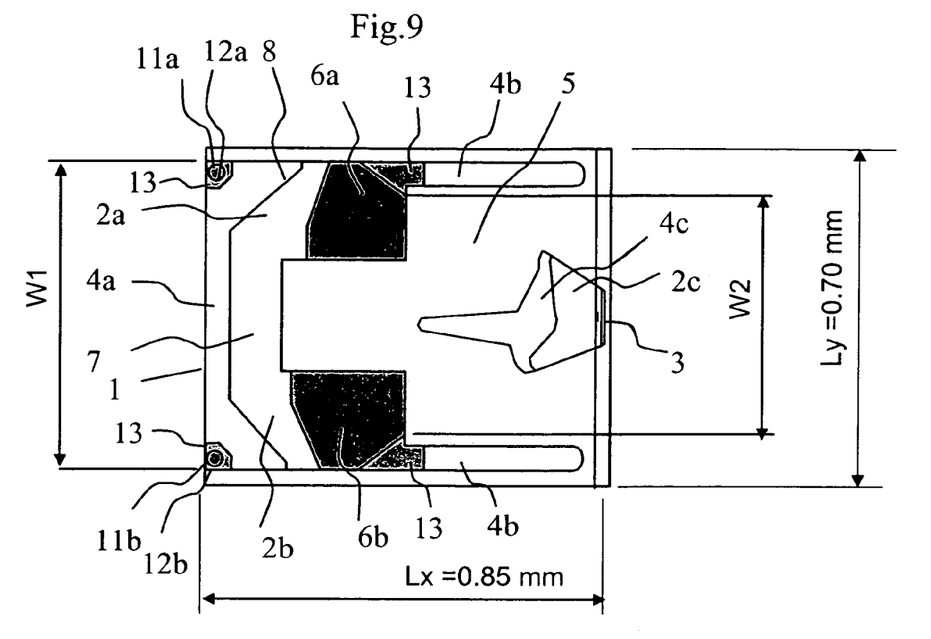
FIG. 9 is a plan view of a magnetic head slider according to a sixth embodiment of the present invention.

A sixth embodiment is shown in FIG. 9. This figure shows an example in which leading-side pads are set up just narrowly at both lateral ends of a slider. This configuration is effective for significant reduction of the earlier-mentioned external disturbance, vibration, and of medium contact damage caused by contact of any corners due to slider vibration. The configuration is also effective in avoiding a disk crash. In addition, the configuration can avoid pitch-down during loading/unloading, significantly reduce medium contact damage caused by contact of any corners due to slider vibration, and avoid a disk crash. Furthermore, in the present embodiment, a line segment that changes from width W2 of the stepped surface trailing edges on the above-mentioned leading-side flying surface to leading-side width W1 is constructed linearly and both foregoing sides are segments parallel to a lateral direction of the slider and do not have portions which reach both ends of the slider. Although this configuration increases variations in Fly roll due to mask alignment errors, the absence of parallel sections makes it possible to augment inclination margins of the slider in a rolling direction at the lowest flying point during flying. The present embodiment also yields advantageous effects similar to those of the first embodiment.

Figure 10:
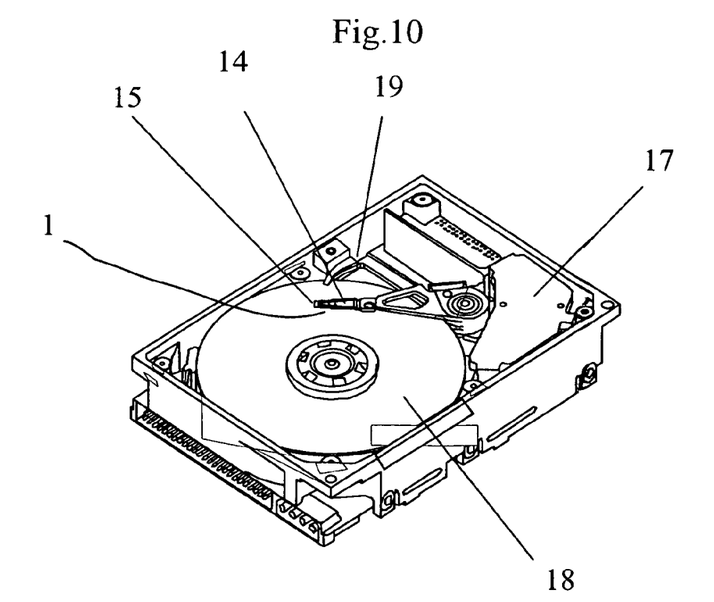
FIG. 10 is a perspective view of a magnetic disk drive mounted with either of the magnetic head sliders according to the first to six embodiments.

A magnetic disk drive with a built-in magnetic head slider according to either of the above six embodiments is shown in FIG. 10. A magnetic head slider 1 flies above a spinning magnetic disk 18. The magnetic head slider 1, supported by a flexure 15 installed on a suspension 14, is actuated to a desired position by an actuator 17, and reads and writes information. When the magnetic disk 18 stops spinning, the magnetic head slider 1 is unloaded from a region above the magnetic disk 18 onto a load/unload ramp 19. In addition to enhancing a suspension load of the magnetic head slider, this magnetic disk drive can improve inclination margins of the slider in a rolling direction at the lowest flying point during flying. It is thus possible to improve shock resistance during disk drive operation, to achieve low flying and stable flying, and to enhance reliability.

The present invention makes it possible, by adopting either of the slider shapes disclosed in the embodiments, to provide a slider that stably flies in low-flying positions with improved as-flying inclination margins of the slider in a rolling direction at the lowest flying point and with the trailing side of a central flying surface fixed at all times at the lowest point. Greater effects can be achieved by application particularly to low-disk-speed small magnetic disk drives with a disk diameter of 1.8 inches or less.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic head slider, comprising:
    a positive-pressure generator disposed in a lateral direction of said slider, between a leading edge and a trailing edge, wherein said positive-pressure generator includes a first flying surface and a second flying surface;
    a first shallow-grooved surface disposed in the lateral direction of said slider, between said positive-pressure generator and the trailing edge, wherein said shallow-grooved surface includes a first side shallow-grooved surface and a second side shallow-grooved surface, both having a depth of d1 with respect to said positive-pressure generator;
    a negative-pressure generator having a depth of d2 greater than depth d1 with respect to said positive-pressure generator, between the first flying surface and the second flying surface and between said first side shallow-grooved surface and said second shallow-grooved surface; and
    a stepped section including a first stepped surface and a second stepped surface which are formed on said first flying surface and said second flying surface, respectively, and which are stepped away from said first flying surface and said second flying surface with height "h" with respect to the first flying surface and second flying surface;
    wherein, an outer width W1 of said stepped section at the leading edge is greater than a width W2 between the stepped surfaces of said stepped section at the trailing edge.

2. The magnetic head slider according to claim 1, further comprising:
    a first shallow-grooved intermediate surface stepped outwardly with height "h" with respect to said first side shallow-grooved surface, between said first flying surface and said first side shallow-grooved surface; and
    a second shallow-grooved intermediate surface stepped outwardly with height "h" with respect to said second side shallow-grooved surface, between said second flying surface and said second side shallow-grooved surface.

3. The magnetic head slider according to claim 1 wherein said positive-pressure generator further includes a connection flying surface, via which said first flying surface and said second flying surface are connected to each other.

4. The magnetic head slider according to claim 1, further comprising:
    a second shallow-grooved section having a depth of d1 with respect to said positive-pressure generator, between the leading edge and said positive-pressure generator.

5. The magnetic head slider according to claim 1, further comprising:
    a first pad and a second pad, both disposed in the lateral direction of said slider between the leading edge and said positive-pressure generator, wherein said pads are both in the same plane as that of said positive-pressure generator; and
    a first pad stepped surface and a second pad stepped surface, formed on said first pad and said second pad, respectively, wherein said pad stepped surfaces both have height "h" with respect to said first pad and said second pad.

6. The magnetic head slider according to claim 1 wherein the height "h" is equal to or less than 50 nm.

7. The magnetic head slider according to claim 1 wherein the type of material constituting said stepped section includes carbon.

8. The magnetic head slider according to claim 1 wherein an end of said negative-pressure generator, at the leading edge, is positioned closer to the leading edge than said stepped section.

9. The magnetic head slider according to claim 1 wherein an end of said stepped section, at the trailing edge, is essentially parallel to the lateral direction of said slider.

10. The magnetic head slider according to claim 1 wherein said slider is 0.7 mm wide and 0.85 mm long, and is used in a magnetic disk drive whose disk diameter is equal to or less than 1.8 inches.

* * * * *